United States Patent
Mohr et al.

(10) Patent No.: US 9,568,967 B2
(45) Date of Patent: Feb. 14, 2017

(54) DATA AND DIGITAL CONTROL COMMUNICATION OVER POWER

(75) Inventors: David P. Mohr, Spring, TX (US); Daniel Humphrey, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 526 days.

(21) Appl. No.: 14/005,244

(22) PCT Filed: Apr. 12, 2011

(86) PCT No.: PCT/US2011/032091
§ 371 (c)(1),
(2), (4) Date: Sep. 13, 2013

(87) PCT Pub. No.: WO2012/141690
PCT Pub. Date: Oct. 18, 2012

(65) Prior Publication Data
US 2014/0006812 A1    Jan. 2, 2014

(51) Int. Cl.
G06F 1/26 (2006.01)
H04L 12/10 (2006.01)

(52) U.S. Cl.
CPC ............. *G06F 1/26* (2013.01); *H04L 12/10* (2013.01)

(58) Field of Classification Search
None
See application file for complete search history.

(56) References Cited

U.S. PATENT DOCUMENTS

| 6,028,888 | A | 2/2000 | Roux | |
|---|---|---|---|---|
| 7,007,182 | B1 | 2/2006 | Tsumura | |
| 8,130,085 | B2* | 3/2012 | Noh | H04B 3/54 340/12.32 |
| 8,144,820 | B2* | 3/2012 | Bonicatto | H04L 27/2053 375/343 |
| 8,467,367 | B2* | 6/2013 | Malladi | H04L 1/0004 370/343 |
| 9,037,305 | B2* | 5/2015 | McHann, Jr. | H02J 13/0062 700/286 |
| 2002/0021209 | A1 | 2/2002 | Fisher et al. | |
| 2002/0039388 | A1 | 4/2002 | Smart et al. | |
| 2003/0133473 | A1 | 7/2003 | Manis et al. | |
| 2004/0037221 | A1* | 2/2004 | Aisa | H02J 13/0048 370/229 |
| 2005/0097369 | A1 | 5/2005 | Bowser et al. | |
| 2008/0157939 | A1* | 7/2008 | Sutardja | H05B 37/0254 340/12.33 |
| 2009/0003481 | A1 | 1/2009 | Schopfer et al. | |
| 2009/0031147 | A1 | 1/2009 | Horvat | |
| 2009/0304101 | A1 | 12/2009 | LoPorto et al. | |
| 2009/0307515 | A1* | 12/2009 | Bandholz | G06F 1/26 713/340 |
| 2010/0057970 | A1 | 3/2010 | Kashi et al. | |
| 2010/0303099 | A1* | 12/2010 | Rieken | H04B 3/54 370/479 |

* cited by examiner

Primary Examiner — Fahmida Rahman
(74) Attorney, Agent, or Firm — Tarolli, Sundheim, Covell & Tummino L.L.P.

(57) ABSTRACT

A power supply system and method are disclosed. The power supply system is to generate a power signal for providing power to a device. The power supply system includes a transmitter to modulate a data signal onto the power signal that is demodulated at the device. The transmitter is further to transmit a separate binary control signal on the power signal to change a state of a digital control parameter associated with the device.

15 Claims, 3 Drawing Sheets

DATA AND DIGITAL CONTROL COMMUNICATION OVER POWER

BACKGROUND

Communication between a power source or a power distribution unit (PDU) and a load device can provide valuable information which can be used to audit, manage, and operate a power distribution system more efficiently. It can be useful for a power supply to provide communication to the load device for a variety of reasons. As an example, the power supply can provide data communications to the load device that can be used for activation/deactivation and/or handshaking. As another example, the power supply can provide a signal that indicates a loss of input power, such as to warn the load device that it needs to prepare for an imminent loss of power.

DETAILED DESCRIPTION

Figure 1:
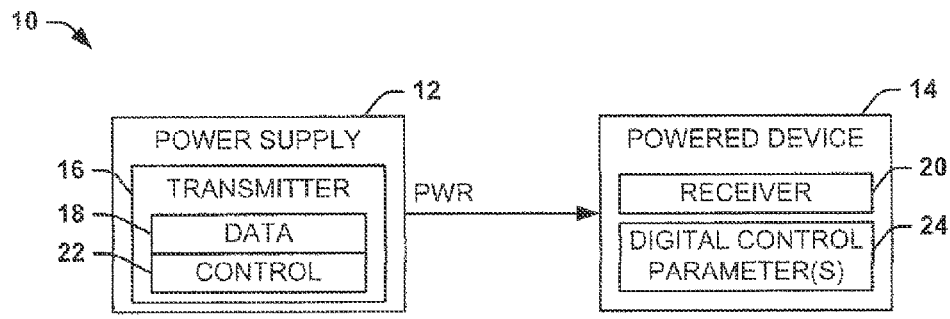
FIG. 1 illustrates an example of a power supply system.

FIG. 1 illustrates an example of a power supply system 10. The power supply system 10 includes a power supply 12 and a powered device 14. The power supply system 10 can be implemented in a variety of applications. For example, the power supply system 10 can he used in a computer application, such that the power supply 12 can be configured as a power distribution unit (PDU) and the powered device 14 can be a computer or an enterprise server. The power supply 12 is configured to provide power to the powered device 14. In the example of FIG. 1, the power is provided from the power supply 12 to the powered device 14 via a power signal PWR. As an example, the power signal PWR can be a DC power signal or an AC power signal. Therefore, the powered device 14 can function in its normal capacity based on receiving the power signal PWR.

To ensure that the power supply system 10 is audited, managed, and operated more efficiently, the power supply 12 may provide communications to and/or from the powered device 14. To provide communications to the powered device 14, the power supply 12 includes a transmitter 16 that is configured to modulate a data signal 18 onto the power signal PWR. The data signal 18 can be configured as a stream of data bits that are modulated onto the power signal PWR, which can be configured as a single conductor, based on varying one of a plurality of modulation states of a carrier signal that is provided on the power signal PWR. As described herein, the data signal 18 describes the actual digital data that is transmitted between the power supply 12 and the powered device 14 while the carrier signal or carrier is the analog form of information, including the data signal 18, that is modulated onto the power signal PWR.

As an example, the data signal 18 can be provided on a carrier signal that is modulated based on phase-shift keying, such that each of the bits of the data signal 18 can be represented based on varying a phase-shift of the carrier of the data signal 18. As another example, the data signal 18 can be provided on a carrier signal that is frequency modulated, such that each of the bits of the data signal 18 can be represented based on varying the frequency of the carrier of the data signal 18. It is to be understood that additional modulations methods can be implemented to modulate the data signal 18 onto the power signal PWR. The powered device 14 includes a receiver 20 that is configured to demodulate the data signal 18, such that the powered device 14 can receive a variety of different communications messages from the power supply 12.

As described above, the data signal 18 can be configured as a stream of data bits that are modulated onto the power signal PWR. Such communications are thus subject to latencies that can be typical to data communication over a single conductor. Such latencies can be further compounded based on the latency that can be associated with modulating the data signal 18 onto a power signal (i.e., the power signal PWR). As a result, there can be significant time delays between the origination of a data message that is provided as the data signal 18 relative to when the receiver 20 can demodulate the data signal 18 for the powered device 14 to react to the communications therein. Therefore, efficient management of the power supply system 10 may demand a more rapid manner of communication between the power supply 12 and the powered device 14.

In the example of FIG. 1, the transmitter 16 is also configured to generate one or more binary control signals 22 that can likewise be modulated onto the power signal PWR. For example, the one or more binary control signals 22 can be provided as a respective one or more separate modulation states of the carrier that are separate from the modulation states of the data signal 18. As an example, the binary control signal(s) 22 can occupy separate frequencies for modulation of the data signal 18 as a frequency modulated signal on the power signal PWR, or can occupy separate phase-angles of the carrier signal in a phase-shift keying modulation of the data signal 18. Therefore, the transmitter 16 can be configured to interrupt the transmission of the stream of data bits of the data signal 18 to transmit a binary control signal 22 on the power signal PWR.

The binary control signal(s) 22 can be configured as single-state control signals. In the example of FIG. 1, the powered device 14 includes one or more digital control parameters 24. Thus, in response to receiving the binary control signal(s) 22 (e.g., via the receiver 20), the powered device 14 can be configured to adjust a state of a corresponding digital control parameter 24. For example, the digital control parameter(s) 24 can correspond to activation and/or deactivation of specific functions of the powered device 14. Because the binary control signal(s) 22 can be provided very rapidly as single-state control signals that are separate from and interleaved with the data signal 18, the binary control signal(s) 22 can be very rapidly provided to the powered device 14 without being subject to the latency involved with modulating such commands into the data signal 18. Accordingly, the powered device 14 can respond with the appropriate action (e.g., controlling a state of a digital control parameter) rapidly for efficient management of the power supply system 10. For example, the power supply 12 can provide a binary control signal 22 to indicate a loss of input power to rapidly warn the powered device 14 of an imminent loss of power.

Figure 2:
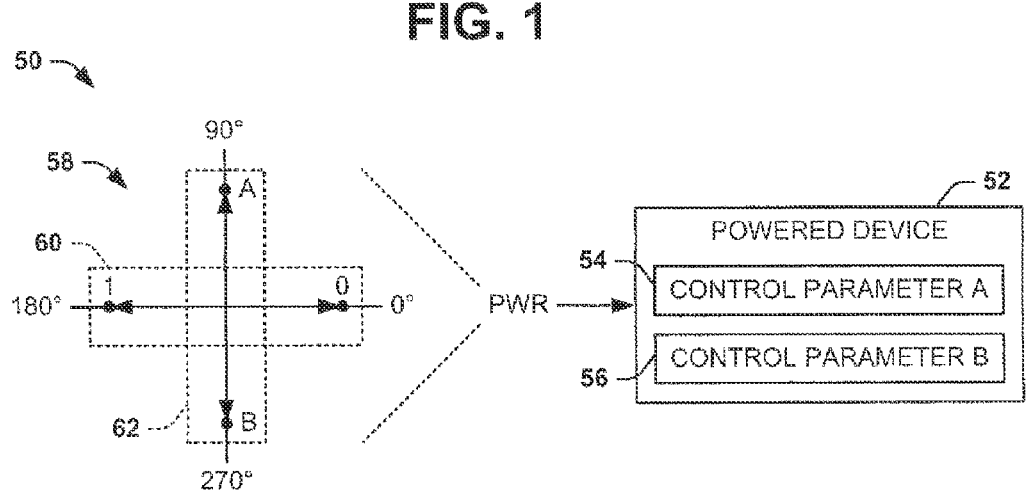
FIG. 2 illustrates an example of a digital control system.

FIG. 2 illustrates an example of a digital control system 50. The digital control system 50 can correspond to the power supply system 10 in the example of FIG. 1. Therefore, reference is to be made to the example of FIG. 1 in the following description of the example of FIG. 2.

The digital control system 50 includes a powered device 52, which could correspond to the powered device 14 in the example of FIG. 1. The powered device 52 includes a first digital control parameter 54 and a second digital control parameter 56, demonstrated in the example of FIG. 2 as CONTROL PARAMATER A and CONTROL PARAMETER B, respectively. The digital control parameters 54 and 56 can correspond to any of a variety of binary-state control functions associated with the powered device 52, such as can be activated or deactivated based on a single-state signal. For example, one of the digital control parameters 54 and 56 can correspond to deactivation of functionality of the powered device and/or activation of an uninterruptable power supply (UPS), such as can be initiated in response to a loss of power of the power supply 12 (not shown in the example of FIG. 2).

The digital control system 50 also demonstrates a phase-shift keying 58 associated with a carrier signal of the power signal PWR that is provided to the powered device 52. The phase-shift keying 58 thus corresponds to modulation of a data signal 60 and binary control signals 62 onto the power signal PWR. In the example of FIG. 2, the data signal 60 is demonstrated as a bit "0" at a 0° phase-shift and a bit "1" at a 180° phase-shift associated with the carrier on the power signal PWR. Therefore, the data signal 60 can be represented by a stream of data bits based on varying the phase of the carrier of the power signal PWR between 0° and 180°. For example, a receiver of the powered device 52 (not shown in the example of FIG. 2) can include a phase-locked loop (PLL; not shown) that can provide a phase reference and a band-pass filter (BPF; not shown) that can remove frequencies outside of the band of the carrier frequency. Therefore, the powered device 52 can monitor the phase of the carrier on the power signal PWR to demodulate the data signal 60.

In the example of FIG. 2, the binary control signals 62 are demonstrated as a binary control signal "A" at a 90° phase-shift and a binary control signal "B" at a 270° phase-shift associated with the carrier on the power signal PWR. Therefore, the binary control signals 62 can interrupt the stream of data bits based on varying the phase of the carrier of the power signal PWR to 90° to provide the binary control signal "A" and 270° to provide the binary control signal "B". Therefore, in response to receiving the binary control signal "A", the powered device 52 can change a state of the first digital control parameter 54. Similarly, in response to receiving the binary control signal "B", the powered device 52 can change a state of the second digital control parameter 56. As an example, receiving the binary control signals 62 can cause the states of the digital control parameters 54 and 56, respectively, to toggle between states. As another example, the digital control parameters 54 and 56 can be related and can correspond to activation and deactivation of a single control function, respectively. Thus, in this example, receiving the binary control signal "A" can cause the single control function to be activated and subsequently receiving the binary control signal "B" can cause the single control function to be deactivated.

Figure 3:
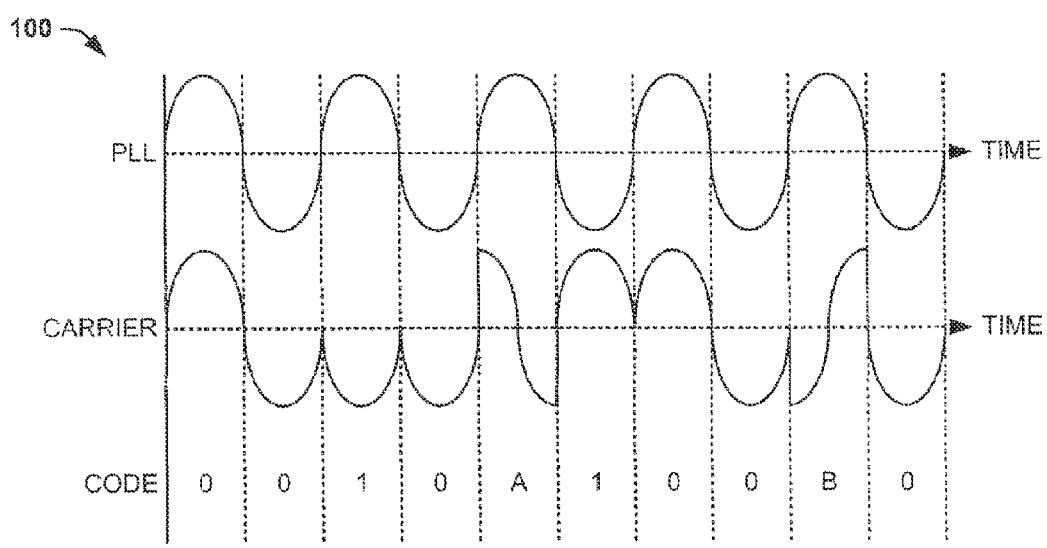
FIG. 3 illustrates an example of a timing diagram.

FIG. 3 illustrates an example of a timing diagram 100. The timing diagram 100 can correspond to a timing diagram associated with the digital control system 50 in the example of FIG. 2. Therefore, reference is to be made to the example of FIG. 2 in the following description of the example of FIG. 3.

The timing diagram 100 demonstrates signals as a function of time. Specifically, the timing diagram 100 includes a sine-wave that can be generated in a phase-locked loop in the receiver of the powered device 52, demonstrated in the example of FIG. 3 as a signal "PLL". The timing diagram 100 also includes the carrier signal that is modulated onto the power signal PWR, demonstrated in the example of FIG. 3 as a signal "CARRIER". Additionally, the timing diagram 100 includes a stream of data that includes the data signal 60 and the binary control signals 62, demonstrated in the example of FIG. 3 as a digital signal "CODE". In the example of FIG. 3, the timing diagram 100 is demonstrated such that every half-period of the signal PLL, and thus every half-period of the signal CARRIER, corresponds to a given bit of the data signal 60 or a given one of the binary control signals 62. However, it is to be understood that the encoding of each bit of the data signal 60 or a binary control signal 62 could be more or less frequent, such as at each quarter-period or each full period.

Thus, in the example of FIG. 3, the signal CODE is demonstrated as a first bit "0" and a second bit "0" of the data signal 60 corresponding to the signal CARRIER being in-phase (e.g., phase-shifted by 0°) relative to the signal PLL. The signal CODE is then demonstrated as a third bit "1" corresponding to the signal CARRIER being phase-shifted by 180° relative to the signal PLL, followed by a fourth bit "0". The signal CODE is then demonstrated as including the binary control signal "A" after the fourth bit "0". Therefore, an associated transmitter (e.g., the transmitter 16 in the example of FIG. 1) interrupts the data signal 60 to transmit the single-state binary command signal "A" to command the powered device 52 to rapidly change a state of the first control parameter 54. The transmitter then resumes transmission of the data signal 60 by providing a fifth bit "1" of the data signal 60.

The signal CODE is then demonstrated as a including a sixth bit "0" and a seventh bit "0" of the data signal 60 corresponding to the signal CARRIER being in-phase relative to the signal PLL. The signal CODE is then demonstrated as including the binary control signal "B" after the seventh bit "0". Therefore, the transmitter again interrupts the data signal 60 to transmit the single-state binary command signal "B" to command the powered device 52 to rapidly change a state of the second control parameter 56. The transmitter then resumes transmission of the data signal 60 by providing an eighth bit "0" of the data signal 60. Accordingly, the timing diagram 100 demonstrates that the binary control signals 62 can interrupt the data signal 60 to provide rapid commands to the powered device 52.

Figure 4:
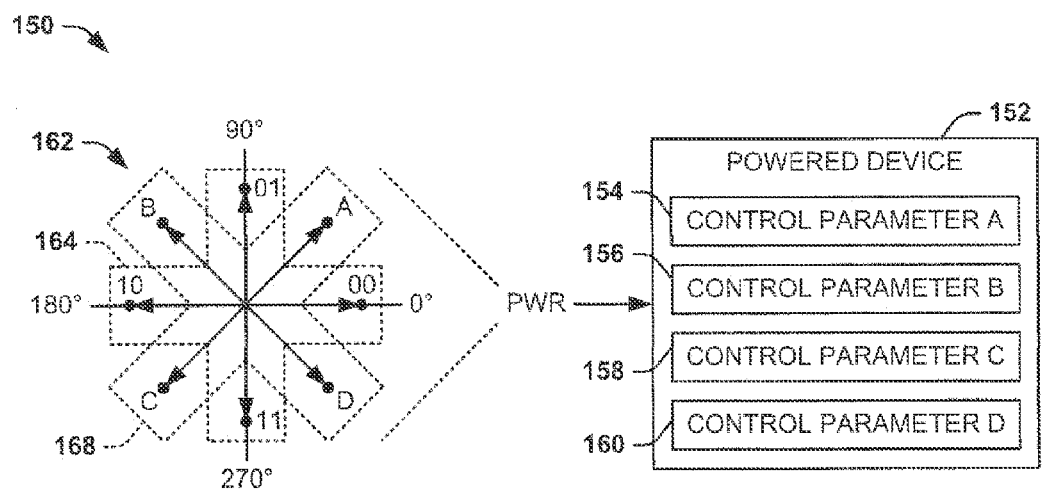
FIG. 4 illustrates another example of a digital control system.
Figure 5:
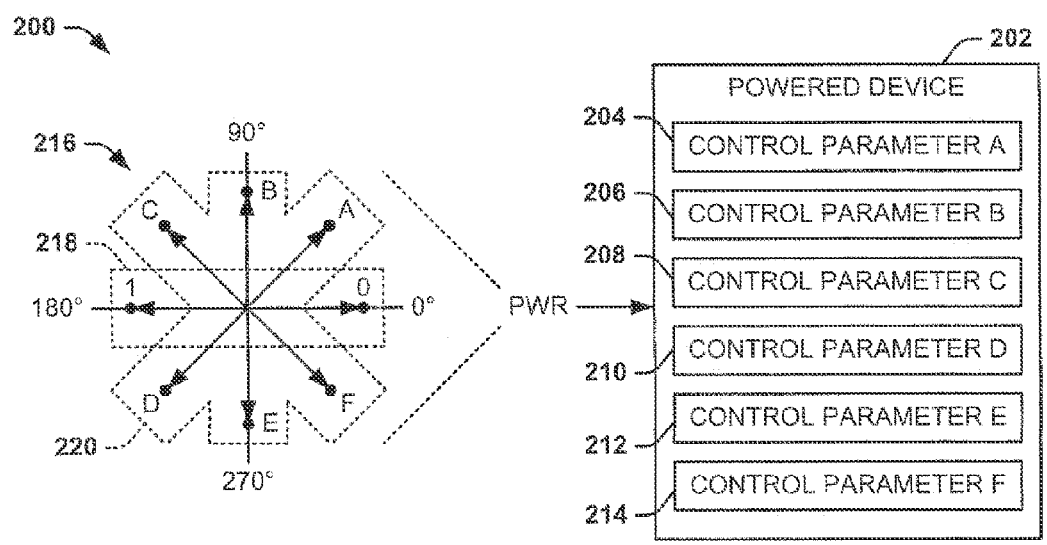
FIG. 5 illustrates yet another example of a digital control system.

Other types of phase-relationships between the data signal 60 and the binary control signals 62 are possible, as demonstrated in the examples of FIGS. 4 and 5. FIG. 4 illustrates another example of a digital control system 150. The digital control system 150 can correspond to the power supply system 10 in the example of FIG. 1. Therefore, reference is to be made to the example of FIG. 1 in the following description of the example of FIG. 4.

The digital control system 150 includes a powered device 152, which could correspond to the powered device 14 in the example of FIG. 1. The powered device 152 includes a first digital control parameter 154, a second digital control parameter 156, a third digital control parameter 158, and a fourth digital control parameter 160, demonstrated in the example of FIG. 4 as CONTROL PARAMATERs A through D, respectively. The digital control parameters 154, 156, 158, and 160 can correspond to any of a variety of binary-state control functions associated with the powered device 152, such as can be activated or deactivated based on a single-state signal.

The digital control system 150 also demonstrates a phase-shift keying 162 associated with a carrier signal of the power signal PWR that is provided to the powered device 152. The phase-shift keying 162 thus corresponds to modulation of a data signal 164 and binary control signals 166 onto the power signal PWR. In the example of FIG. 4, the data signal 164 is demonstrated as a plurality of bits at each of a plurality of phase-angles of the phase-shift keying 162. For example, the data signal 164 is demonstrated as bits "00" at a 0° phase-shift, bits "01" at a 90° phase-shift, bits "10" at a 180° phase-shift, and bits "11" at a 270° phase-shift associated with the carrier on the power signal PWR. Therefore, the data signal 164 can be provided from the transmitter at approximately double the baud-rate of the data signal 60 in the example of FIG. 2.

In the example of FIG. 4, the binary control signals 166 are demonstrated as a binary control signal "A" at a 45° phase-shift, a binary control signal "B" at a 135° phase-shift, a binary control signal "C" at a 225° phase-shift, and a binary control signal "D" at a 315° phase-shift associated with the carrier on the power signal PWR. Therefore, the binary control signals 166 can interrupt the stream of data bits based on varying the phase of the carrier of the power signal PWR to 45°, 135°, 225°, or 315° to provide the binary control signals "A", "B", "C", or "D", respectively. Therefore, in response to receiving the binary control signal "A", the powered device 152 can change a state of the first digital control parameter 154. In addition, in response to receiving the binary control signal "B", the powered device 152 can change a state of the second digital control parameter 156. Similarly, in response to receiving the binary control signal "C", the powered device 152 can change a state of the third digital control parameter 158. Finally, in response to receiving the binary control signal "D", the powered device 152 can change a state of the fourth digital control parameter 158.

FIG. 5 illustrates another example of a digital control system 200. The digital control system 200 can correspond to the power supply system 10 in the example of FIG. 1. Therefore, reference is to be made to the example of FIG. 1 in the following description of the example of FIG. 5.

The digital control system 200 includes a powered device 202, which could correspond to the powered device 14 in the example of FIG. 1. The powered device 202 includes a first digital control parameter 204, a second digital control parameter 206, a third digital control parameter 208, and a fourth digital control parameter 210, a fifth digital control parameter 212, and a sixth digital control parameter 214, demonstrated in the example of FIG. 5 as CONTROL PARAMATERs A through F, respectively. The digital control parameters 204, 206, 208, 210, 212, and 214 can correspond to any of a variety of binary-state control functions associated with the powered device 202, such as can be activated or deactivated based on a single-state signal.

The digital control system 150 also demonstrates a phase-shift keying 216 associated with a carrier signal of the power signal PWR that is provided to the powered device 202. The phase-shift keying 216 thus corresponds to modulation of a data signal 218 and binary control signals 220 onto the power signal PWR. In the example of FIG. 5, the data signal 218 is demonstrated as a plurality of bits at each of a plurality of phase-angles of the phase-shift keying 216. For example, the data signal 218 is demonstrated as a bit "0" at a 0° phase-shift and a bit "1" at a 180° phase-shift associated with the carrier on the power signal PWR, similar to as described above in the example of FIG. 2.

In the example of FIG. 5, the binary control signals 220 are demonstrated as a binary control signal "A" at a 45° phase-shift, a binary control signal "B" at a 90° phase-shift, a binary control signal "C" at a 135° phase-shift, a binary control signal "D" at a 225° phase-shift, a binary control signal "E" at a 270° phase-shift, and a binary control signal "F" at a 315° phase-shift associated with the carrier on the power signal PWR. Therefore, the binary control signals 220 can interrupt the stream of data bits based on varying the phase of the carrier of the power signal PWR to 45°, 90°, 135°, 225°, 270°, or 315° to provide the binary control signals "A", "B", "C", "D", "E", or "F", respectively. Therefore, in response to receiving any one of the binary control signals "A" through "F", the powered device 202 can change a state of the respective one of the digital control parameters 204, 206, 208, 210, 212, and 214.

It is to be understood that the digital control systems 50, 150, and 200 are not limited to the examples of FIGS. 2, 4, and 5, respectively. Additional phase-angle or other modulation methods can be implemented to provide the binary control signals 22 with the data signal 18 that is modulated onto the power signal PWR. For example, the phase-shift keying can include additional phase-angles corresponding to either data or additional binary control signals, such as at every 30° or every 15°. As another example, the binary control signals 22 can be provided with the data signal 18 onto the power signal PWR based on other types of modulation, such as frequency or amplitude modulation. Thus, the digital control systems 50, 150, and 200 can be configured in a variety of ways.

Figure 6:
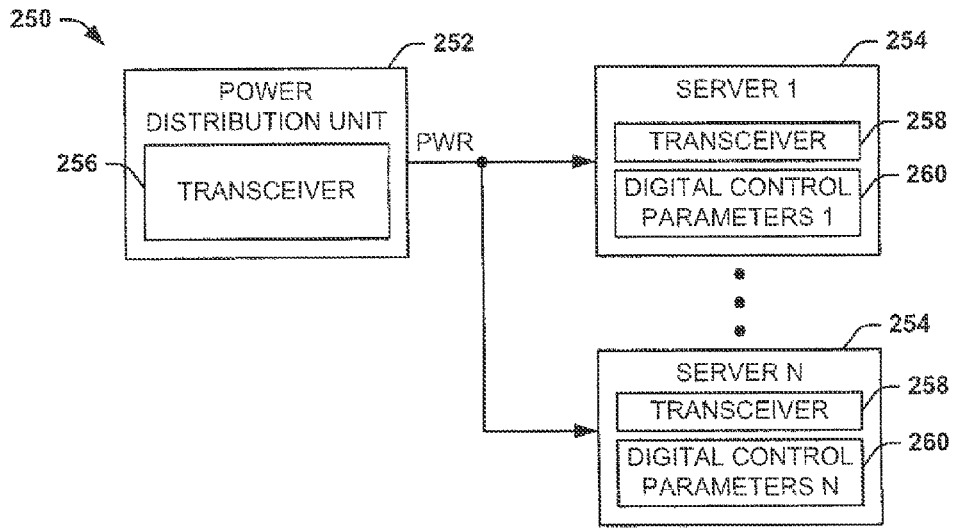
FIG. 6 illustrates another example of a power supply system.

FIG. 6 illustrates another example of a power supply system 250. The power supply system 250 includes a power distribution unit (PDU) 252 and a plurality N of servers 254, where N is a positive integer. The PDU 252 is configured to provide power to the servers 254. In the example of FIG. 1, the power is provided from the PDU 252 to the servers 254 via a power signal PWR. As an example, the power signal PWR can be a DC power signal or an AC power signal. While the example of FIG. 6 demonstrates that all of the powered devices are servers 254, it is to be understood that one or more of the servers 254 could be other types of powered devices that receive power from the PDU 252.

The PDU 252 includes a transceiver 256 that is configured to modulate a data signal and one or more binary control signals onto the power signal PWR, similar to as described above in the examples of FIGS. 2-5. As an example, the data signal can be configured as a stream of data bits that are modulated onto the power signal PWR, which can be configured as a single conductor, based on varying one of a plurality of modulation states of a carrier signal that is provided on the power signal PWR. As another example, the one or more binary control signals can be provided as a respective one or more separate modulation states of the carrier that are separate from the modulation states of the data signal. Therefore, the transceiver 256 can be configured to interrupt the transmission of the stream of data bits of the data signal to transmit a binary control signal on the power signal PWR.

The servers 254 each include a transceiver 258 that is configured to demodulate the data signal, such that the servers 254 can receive a variety of different communications messages from the PDU 252. Similarly, the transceiver 258 can be configured to demodulate the binary control signal(s). In the example of FIG. 6, the servers 254 include one or more digital control parameters 260. Thus, in response to receiving the binary control signal(s), the servers 254 can be configured to adjust a state of a corresponding digital control parameter 260. For example, the digital control parameter(s) 260 can correspond to activation and/or deactivation of specific functions of the servers 254. In addition, the transceivers 258 of one or more of the servers 254 can likewise be configured to modulate a data signal and one or more binary control signals onto the power signal PWR. Therefore, the transceiver 256 of the PDU 252 can be configured to demodulate the data signal and/or the binary control signals that are provided from one or more of the servers 254. Accordingly, the transceiver 256 of the PDU 252 and the transceivers 258 of the servers 254 can provide bidirectional communication in the form of data signals and/or binary control signals.

Figure 7:
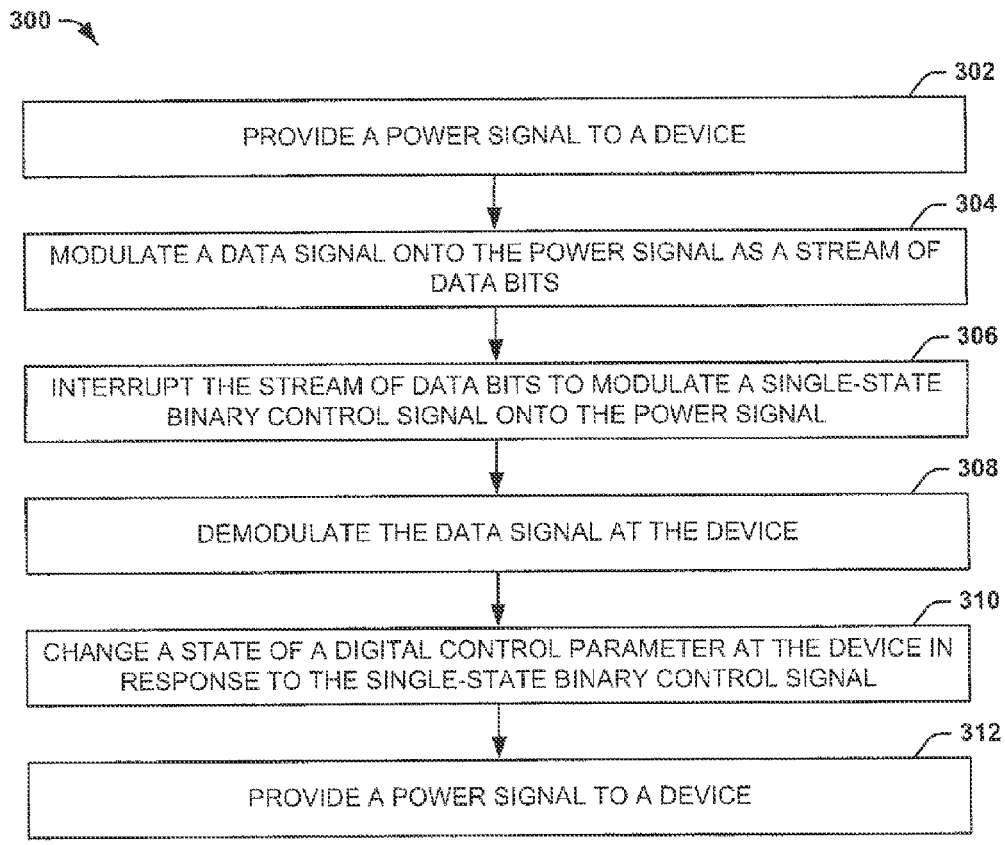
FIG. 7 illustrates an example of a method for providing digital communication in a power system.

In view of the foregoing structural and functional features described above, an example method will be better appreciated with reference to FIG. 7. While, for purposes of simplicity of explanation, the method of FIG. 7 is shown and described as executing serially, it is to be understood and appreciated that the method is not limited by the illustrated order, as parts of the method could occur in different orders and/or concurrently from that shown and described herein.

FIG. 7 illustrates an example of a method 300 for providing digital communication in a power system. At 302, a power signal is provided to a device. At 304, a data signal is modulated onto the power signal as a stream of data bits. At 306, the stream of data bits is interrupted to modulate a single-state binary control signal onto the power signal. At 308, the data signal is demodulated at the device. At 310, a state of a digital control parameter is changed at the device in response to the single-state binary control signal.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed:

1. A power supply system to generate a power signal for providing power to a device, the power supply system comprising:
   a transmitter to:
      modulate a data signal onto the power signal as a stream of bits, the data signal to be demodulated at the device, and
      modulate a single-state binary control signal onto the power signal to change a state of a digital control parameter associated with the device,
   wherein the transmitter is to modulate the data signal and the single-state binary control signal to occupy different modulation states of a plurality of modulation states provided on the power signal, the plurality of modulation states being a plurality of phase angles of a phase-shift keying modulation of the power signal,
   the transmitter is to modulate the single-state binary control signal on a phase angle of the plurality of phase angles different from a phase angle of the plurality of phase angles on which the transmitter modulates the data signal,
   the device includes a phase-locked loop to generate a sinusoidal wave to demodulate the data signal and the binary control signal, and
   the single-state binary control signal and each bit of the stream of bits of the data signal are encoded according to a same unit of time, the unit of time being a fixed multiple of a quarter-period of the sinusoidal wave.

2. The system of claim 1, wherein the plurality of modulation states are provided on a carrier signal of the power signal.

3. The system of claim 1, wherein the data signal is configured as having a plurality of bits at multiple phase angles of the plurality of phase angles.

4. The system of claim 1, wherein the single-state binary control signal is among a plurality of single-state binary control signals, the device being further to control a respective plurality of digital control parameters in response to the plurality of single-state binary control signals.

5. The system of claim 1, wherein the transmitter is to interrupt modulating the data signal onto the power signal to provide the single-state binary control signal to the device.

6. The system of claim 1, further comprising a power distribution unit to provide the power signal to each of a plurality of devices, each of the plurality of devices comprising a respective receiver that is to demodulate the data signal and the single-state binary control signal.

7. The system of claim 5, wherein the transmitter is to resume modulating the interrupted data signal on to the power signal after providing the single-state binary control signal.

8. The system of claim 1, wherein the device includes a receiver to demodulate the data signal and the single-state binary control signal,
   each of the transmitter and the receiver are configured as transceivers, such that the data signal and the single-state binary control signal are bidirectional signals between the power supply system and the device.

9. A method comprising:
   providing to a device a power signal to power the device, the power signal having a plurality of modulation states, the plurality of modulation states being a plurality of phase angles of a phase-shift keying modulation of the power signal;
   modulating a data signal onto the power signal as a stream of data bits using a first modulation state of the plurality of modulation states provided on the power signal;
   interrupting the stream of data bits of the data signal to modulate a single-state binary control signal onto the power signal using a second modulation state of the plurality of modulation states, the first modulation state and the second modulation state being associated with different phase angles of the plurality of phase angles;
   demodulating the data signal and the single-state binary control signal using a sinusoidal wave generated by a phase-locked loop at the device; and
   changing a state of a digital control parameter at the device in response to the single-state binary control signal, wherein
   the single-state binary control signal and each bit of the stream of data bits of the data signal are encoded within a same unit of time, the unit of time being a fixed multiple of a quarter-period of the sinusoidal wave.

10. The method of claim 9, wherein the plurality of modulation states are provided on a carrier signal of the power signal,
the first modulation state is among multiple modulation states of the plurality of modulation states occupied by the data signal,
modulating the data signal onto the power signal comprises varying the carrier signal at the multiple modulation states occupied by the data signal according to the stream of data bits,
and wherein interrupting the stream of data bits to modulate the single-state binary control signal comprises varying the carrier signal at the second modulation state and not varying the carrier signal at the multiple modulation states occupied by the data signal.

11. The method of claim 9, wherein
modulating the data signal onto the power signal comprises phase-shifting a carrier signal of the power signal at a plurality of phase angles associated with the data signal, and
interrupting the stream of data bits to modulate the single-state binary control signal comprises phase-shifting the carrier signal at a phase angle that is separate from the plurality of phase angles associated with the data signal.

12. The method of claim 9, wherein interrupting the stream of data bits to modulate the single-state binary control signal comprises modulating the single-state binary control signal as one of a plurality of single-state binary control signals, the device being further to control a respective one of a plurality of digital control parameters in response to the one of the plurality of single-state binary control signals.

13. A power distribution system comprising:
a power distribution unit to generate a power signal for providing power, the power distribution unit comprising a transmitter to modulate a data signal and a binary control signal onto the power signal; and
a plurality of devices to receive the power signal, each of the plurality of devices comprising a receiver that is to demodulate the data signal and the binary control signal, each of the plurality of devices being further to change a state of a digital control parameter in response to the binary control signal,
wherein a plurality of modulation states are provided on the power signal, the plurality of modulation states being a plurality of phase angles of a phase-shift keying modulation of the power signal,
the transmitter modulates the binary control signal on a phase angle of the plurality of phase angles different from a phase angle of the plurality of phase angles on which the transmitter modulates the data signal,
the receiver includes a phase-locked loop to generate a sinusoidal wave to demodulate the data signal and the binary control signal,
the data signal includes a stream of data bits,
the binary control signal is a single-state signal, and
each bit of the stream of data bits of the data signal and the single-state binary control signal are encoded within a same unit of time, the unit of time being a fixed multiple of a quarter-period of the sinusoidal wave.

14. The system of claim 13, wherein the transmitter and each receiver associated with the plurality of devices are configured as transceivers, such that the data signal and the binary control signal are configured as bidirectional signals between the power distribution unit and the plurality of devices.

15. The system of claim 13, wherein
the data signal communicates information about a status of the power distribution unit to the plurality of devices, and
the binary control signal is a command to control the plurality of devices without information about the power distribution unit.

* * * * *